(12) United States Patent
Ferris et al.

(10) Patent No.: US 10,346,334 B2
(45) Date of Patent: Jul. 9, 2019

(54) MODE SWITCHABLE AUDIO PROCESSOR FOR DIGITAL AUDIO

(71) Applicant: Plantronics, Inc., Santa Cruz, CA (US)

(72) Inventors: Barry C Ferris, Santa Cruz, CA (US); Carl Andrew Kochalko, Santa Cruz, CA (US)

(73) Assignee: Plantronics, Inc., Santa Cruz, CA (US)

( * ) Notice: Subject to any disclaimer, the term of this patent is extended or adjusted under 35 U.S.C. 154(b) by 53 days.

(21) Appl. No.: 15/177,778

(22) Filed: Jun. 9, 2016

(65) Prior Publication Data

US 2017/0357474 A1    Dec. 14, 2017

(51) Int. Cl.
| | |
|---|---|
| *G06F 17/00* | (2019.01) |
| *G06F 13/38* | (2006.01) |
| *G06F 3/16* | (2006.01) |
| *H04R 1/10* | (2006.01) |
| *G06F 13/42* | (2006.01) |

(52) U.S. Cl.
CPC ............ *G06F 13/385* (2013.01); *G06F 3/165* (2013.01); *G06F 13/4282* (2013.01); *H04R 1/1008* (2013.01); *H04R 1/1041* (2013.01); *H04R 2420/07* (2013.01); *H04R 2420/09* (2013.01)

(58) Field of Classification Search
CPC .................................. G06F 3/162; G06F 3/165
See application file for complete search history.

(56) References Cited

U.S. PATENT DOCUMENTS

| | | | | |
|---|---|---|---|---|
| 9,675,871 | B1* | 6/2017 | Jetter | A63F 13/00 |
| 2005/0221894 | A1* | 10/2005 | Lum | A63F 13/06 |
| | | | | 463/37 |
| 2009/0307380 | A1* | 12/2009 | Lee | G06F 13/387 |
| | | | | 710/14 |

OTHER PUBLICATIONS

Unknown, "Bus Enumeration," Universal Serial Bus Specification Revision 2.0, Paragraph 9.1.2, found at URL <http://www.usb.org/developers/docs/usb20_docs/#usb20spec>, 16 pages, Apr. 27, 2000.
Unknown, "Implementing the USB Enumeration Process on the AT8xC5131/32/22 and AT8xC51SND1," AMTE USB Microcontrollers Application Note, found at URL <www.atmel.com/Images/doc4290.pdf>, 14 pages, 2003.

(Continued)

*Primary Examiner* — Joseph Saunders, Jr.
(74) *Attorney, Agent, or Firm* — Slayden Grubert Beard PLLC; Thomas S. Dienwiebel (57) ABSTRACT

An audio processor for digital audio data is provided, which comprises at least a host interface for connection to a digital audio host to transfer the digital audio data between the digital audio host and the audio processor; a device interface for connection to a user audio device; and a processing unit, connected with the host interface and the device interface. To allow a user to employ an audio device, such as a speaker or a pair of headphones of their choice when connecting to different digital audio hosts, said processing unit is configured to at least conduct a configuration procedure, in which the processing unit communicates with said digital audio host in one of at least a first communication mode and a second communication mode, wherein the communication modes differ from each other, and wherein the communication mode is selected according to the setting of a communication mode selector.

20 Claims, 8 Drawing Sheets

(56) References Cited

OTHER PUBLICATIONS

Unknown, "Enumerating the Devices on a Bus," found at URL <https://msdn.microsoft.com/en-us/windows/hardware/drivers/wdf/enumerating-the-devices-on-a-bus>, 1 page, found on May 23, 2016.

Unknown, "Connect the G633 Gaming Headset to Compatible Devices," Logitech Support Article, found at URL <http://support.logitech.com/en_us/article/Connect-the-G633-gaming-headset-to-compatible-devices?product=a0qi0000006Ql2PAAW>, 5 pages, found on Mar. 29, 2016.

Reynolds, et al., "Headset Audio System," Utility U.S. Appl. No. 14/991,441, filed Jan. 8, 2016, 26 pages.

\* cited by examiner

MODE SWITCHABLE AUDIO PROCESSOR FOR DIGITAL AUDIO

TECHNICAL FIELD

The present invention relates to the field of digital audio used in computing and gaming applications.

BACKGROUND

An increasing number of computing applications provide audio to a user and/or allow user audio input for various functions, including phone or chat applications, controlling software functionality, or controlling internal and external computer hardware and periphery.

In the field of gaming applications, voice-activated control is also used increasingly. In addition, specific multi-player games allow group audio chats between the connected local and remote players.

In all of the aforesaid applications, audio devices, such as speakers and headsets, are being used. In particular when using headsets, user comfort may be a concern, e.g., when such are worn over an extended period of time. In addition, the present inventors have recognized that users typically prefer one particular type and style of headset, the more that the respective headset is worn over long hours. Certainly, sound quality forms another important factor for a user's preference, which generally refers to all audio devices, including speakers and headsets.

In recent years, digital connections became common for transmitting audio between a computing device and an audio device. For example, a variety of devices allow audio transmission only over a USB (Universal Serial Bus) connector. As will be apparent, this development may hinder the use of the user's preferred audio device, e.g., in case the latter uses a standard 3.5 mm headphone socket.

But even if the user's audio device comprises a USB (Universal Serial Bus) connector, it is not necessarily given that the user can actually use his or her headset in view of the availability of several protocols that are currently being used for digital audio transmission.

Accordingly, a need exists to allow users to employ their audio device of choice when connecting the latter to different digital audio sources.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

According to one aspect of the present invention, an audio processor for digital audio data is provided, comprising at least a host interface for connection to a digital audio host and to transfer digital audio data between the digital audio host and the audio processor; a device interface for connection to a user audio device; and a processing unit connected with said host interface and said device interface. According to the present aspect, the processing unit is configured to at least conduct a configuration procedure, in which the processing unit communicates with said digital audio host in one of at least a first communication mode and a second, different communication mode, which communication mode is selected according to the setting of a communication mode selector.

The basic idea of the present invention is to provide an audio processor, which is connectable between a digital audio source and a user's audio device and which thus may form a configurable "interface" for communication in multiple, different (digital) communication modes, e.g., of different audio hosts. The audio processor thus advantageously allows the connection of a user audio device irrespective of the communication mode of the respective digital audio source.

This aspect and other aspects of the invention will be apparent from and elucidated with reference to the embodiments described hereinafter.

DETAILED DESCRIPTION OF PREFERRED EMBODIMENTS

Technical features described in this application can be used to construct various embodiments of audio processors, headset systems, and methods of processing digital audio data according to embodiments described herein.

In the following explanation of the present invention according to the embodiments described, the terms "connected to/with" and "for connection to/with" are used to indicate a data or an audio connection between at least two devices, components, elements, modules, or units. Such connection may be direct or indirect, i.e., in the latter case over intermediate devices, components, elements, modules, or units. The respective connection may be conductor/wire based or wireless. Furthermore, the respective connection may be permanent or temporary.

As discussed in the preceding and in one exemplary aspect, an audio processor for digital audio data is provided, comprising at least a host interface, a device interface, and a processing unit. The host interface is adapted for connection to a digital audio host to transfer digital audio data. The device interface is adapted for connection to a user audio device. The processing unit is connected at least with said host interface and said device interface and is configured to at least conduct a configuration procedure.

The host interface and the device interface may each be configured for wireless and/or conductor based (wired) operation, depending on the respective application. For example, in case the user audio device is a wireless headset, it will be apparent that the device interface should be configured for wireless operation according to the specification of the headset, such as for example Bluetooth® audio (A2DP). According to a further additional or alternative example and in case the digital audio host is a computer having a standard USB (Universal Serial Bus) port, the host interface should be adapted for a wire-based connection.

It should be noted that the term "digital audio host" in this context refers to any type of device that is configured to provide and/or receive digital audio data to and/or from a user audio device, such as for example a computer, smart phone, tablet, TV, stereo system, MP3 player, PDA, game console, mobile game device, smart watch, etc. The digital audio data may be in any suitable format, such as PCM, AAC, DSD, AC3, DTS, or MP3 format.

The term "user audio device" in the present context relates to any electroacoustic device, capable of providing audio to a user and/or to record user audio. Examples of user audio devices include speakers (active and passive), headphones of all types, such as earphones, earbuds, headsets. While the term "headset" typically refers to user-wearable devices that are capable to provide and record audio using at least a suitable headphone and a suitable microphone, in the following explanation, the term "headset" will be used to generally refer to user-wearable audio devices, independent of the question, whether audio is provided and/or audio is recorded. Thus it is understood that the term "headset" in the following may refer to head wearable audio playback and/or recording devices, including, but not limited to headphones, earphones, and earbuds.

As discussed in the preceding, the audio processor according to the present aspect further comprises the processing unit. The processing unit may be of any suitable type and may comprise discrete and/or integrated electronics. For example, the processing unit may comprise a computing device, having at least a processor with memory/storage comprising a suitable programming/software to provide the functionality discussed in the preceding and also in the following description. The software can include a kernel, operating system, and/or a shell or interface. One or more application programs or modules may be "loaded", i.e., transferred from storage into and for execution by the processor.

Note that the term "module" as used herein may refer to a collection of routines and data structures that perform a particular task or implements a particular abstract data type. Modules may be composed of two parts: 1) an interface that lists the constants, data types, variables, and routines that can be accessed by other modules or routines and 2) an implementation that is typically private, accessible only to that module, and includes source code that actually implements the routines in the module. The term "module" may also simply refer to an application, such as a computer program design, to assist in the performance of a specific task. In other examples, at least part of the modules may be implemented by hard-wired logic or other circuitry.

The processing unit according to the present aspect is configured to at least conduct a configuration procedure, in which the processing unit communicates with said digital audio host (if connected) in one of at least a first communication mode and a second communication mode, which communication mode is selected according to the setting of a communication mode selector. Certainly, it is possible that the processing unit in one embodiment is configured for more than two communication modes. Also, the processing unit certainly in another additional or alternative embodiment may be configured for further functions, modes of operation, and procedures, some of which are discussed in more detail in the following.

The term "configuration procedure" in the present context refers to a process in which the communication between audio processor, and e.g., the processing unit, on one hand, and the respective digital audio host on the other hand is configured and one or more communication parameters are determined. Sometimes, in the field of computing and telecommunication technology, this process is also referred to as "handshake", in particular, when during configuration messages are exchanged between the two participants of that communication to determine mutually supported communications parameters. Typically, once the configuration is complete, communication may take place between the participants according to the communications parameters, as agreed upon during the configuration procedure.

The processing unit according to the present aspect is configured during the configuration procedure, to communicate with the (connected) digital audio host in one of at least a first and a second communication mode, where the respectively used communication mode is selected according to the setting of a communication mode selector. The communication mode selector in one example may be data, stored in a suitable memory of, e.g., the processing unit. In another example, the communication mode selector may be preset or pre-defined using a user interface, e.g., having a mechanical toggle switch.

The at least first and second communication modes according to the present aspect differ from each other, i.e., the communication between processing unit and digital audio host differs at least in one aspect, such as, e.g., the communication protocol used. In one example, at least the initial message from the processing unit to the digital audio host, e.g., the so-called "setup request" referring to a USB connection, differs between the at least first and second communication modes. Certainly, in case the processing unit is configured with more than two communication modes, the above would apply to all provided communication modes, i.e., that the communication between processing unit and digital audio host differs between all communication modes in at least one aspect.

Once the configuration procedure is concluded successfully, a transfer of digital audio data between audio processor and digital audio host may take place according to the agreed-upon protocol and parameters.

As will become apparent from the above, the audio processor according to the present aspect allows connecting to different digital audio hosts, which have different configuration procedures/protocols. Thus, it is possible for a user to retain her or his favorite user audio device when connecting to different digital audio hosts.

It is noted that the audio processor in further embodiments may comprise additional components, such as a (host powered) power supply, a battery, a user interface, and/or a housing. In one additional or alternative embodiment, the audio processor is formed as a "USB dongle", having a small, plug-like housing, which provides a very small and mobile form factor.

In one additional or alternative embodiment, the audio processor is formed integrally with the user audio device. In another additional or alternative embodiment, the audio processor is integrated with a control unit, provided to allow user adjustment of one or more audio parameters, as disclosed in utility patent application U.S. Ser. No. 14/991,441, entitled "Headset audio system", filed on Jan. 8, 2016. The contents of the latter utility patent application are incorporated herein by reference for all purposes to the extent that such contents are not inconsistent with the present application.

According to an additional or alternative embodiment, the device interface is adapted for connection to a headset. The connection to the headset may be digital or analog. In case the connection is digital, the device interface may, e.g., comprise a digital audio output using a suitable connector. The processing unit according to a further embodiment may provide format conversion of the digital audio data to and from a user device audio format that is compatible with the headset, if necessary.

In case of an analog connection and in a further embodiment, the audio processor comprises a digital-to-analog (D/A) converter. For example, the processing unit may be configured to convert the digital audio data received from the digital audio host to a typical analog audio signal (line or headphone) and/or convert the acquired analog user audio to the respective digital format, compatible with the audio host.

As discussed in the preceding, the connection to the audio device and, e.g., the headset may be wire-based or wireless. In the latter case and in a further additional or alternative embodiment, the device interface comprises a wireless transmitter for connection with a wireless headset. The wireless transmitter is configured to transmit data to and/or receive data from the wireless headset over a wireless communication medium, such as radio (electromagnetic) communication or infrared (optical) communication.

For example, the wireless transmitter may be adapted for communication over Bluetooth®, Wi-Fi, a cellular connection, ZigBee, NFC, or any other suitable protocol for transmitting audio including analog audio transmission methods (for example using frequency, amplitude, and/or pulse-width modulation). Furthermore, the wireless transmitter may certainly be configured for a suitable proprietary audio transmission protocol, in particular in case the audio processor is adapted to a specific type of headset.

While in another alternative or additional embodiment, the host interface comprises a wireless transmitter, as discussed in the preceding, in a further alternative embodiment, the host interface is configured for a conductor-based connection to the digital audio host, such as a USB® connection.

According to another embodiment, the configuration procedure is an initial enumeration procedure, initiated upon start-up of the audio processor, i.e., initiated upon power-up of the device, upon connection with the digital audio host, or upon reset.

In another additional or alternative embodiment, the communication in said first communication mode corresponds to USB enumeration. In this case, the communication during the configuration procedure may correspond to the procedure as outlined in the USB 2.0 specification, paragraph 9.1.2 "Bus enumeration", available at http://www.usb.org/developers/docs/usb20_docs/usb_20_040816.zip. In one example, the processing unit during configuration presents itself as a USB Audio Device Class device or short a "USB audio class device". In another alternative or additional example, the further communication after the configuration procedure corresponds to a USB Audio Stream.

In a further additional or alternative embodiment, the communication in said second communication mode differs from USB enumeration. In one example, the communication in said second communication mode corresponds to GIP (Gaming Interface Protocol) enumeration. A description of the Gaming Interface Protocol is available from Microsoft, Inc., Redmond, Wash., USA. In one example, the processing unit during configuration presents itself as supporting the GIP protocol. In another alternative or additional example, an audio stream is transmitted after the configuration procedure, which may be identical or similar to a USB Audio Stream.

In a further additional or alternative embodiment, the processing unit during said configuration procedure conducts an authentication process with the digital audio host. Authentication improves the security and reliability of the connection. The processing unit may in one example be configured to conduct an authentication process in all communication modes. In another example, the processing unit may be configured to conduct the authentication process only in one or in some communication modes. In particular, and in a further example, the processing unit is configured to conduct an authentication process during configuration when configured for the Gaming Interface Protocol, as discussed in the preceding.

According to the above description, the communication mode selector allows to determine which of the plurality of communication modes is to be used by the processing unit during configuration. In one additional or alternative embodiment, the communication mode selector allows to be pre-defined by a user. Accordingly, the user may set the audio processor to the desired communication mode prior to the configuration procedure, e.g., prior to start-up.

In one example, a user interface is provided to allow the user to set the respectively desired communication mode selector setting. For example, the user interface may comprise a screen and the setting of the communication mode selector then may be adjusted using the screen. In a further example, the user interface comprises a mechanical switch, such as a slide switch.

According to a further alternative or additional embodiment, the communication mode selector setting is determined automatically by the processing unit from a previous operation cycle. The present embodiment allows, e.g., to rely on the "last known good configuration", which is stored in memory of the processing unit during each operation cycle, e.g., during the configuration procedure.

According to a further alternative or additional embodiment, the processing unit is configured in the configuration procedure to in a first step communicate with said digital audio host according to the communication mode, identified by the setting of the communication mode selector. If this communication fails, i.e., in case the communication with the digital audio host is unsuccessful and in a second step, the processing unit is configured to communicate with the digital audio host in a communication mode that differs from the communication mode used in the previous step.

As will be apparent, the present embodiment allows an automatic determination of the correct communication mode for the respective digital audio host by a "trial-and-error" procedure. For example, in case of a total of two communication modes, the processing unit first tries the communication mode that corresponds to the setting of the mode selector, and if this mode should not allow successful communication, then tries the other of the two modes.

Certainly, and in particular in an embodiment where the processing unit is configured for communication/configuration in more than two communication modes, the conduction of more than two steps may be required to find the correct communication mode for the respective digital audio host.

Accordingly, the second step, mentioned above, may be repeated in this case, where in each iteration, a communication mode is used that differs from the communication modes of all previous steps.

In the present context, communication is regarded as being successful if the configuration procedure can be completed successfully, i.e., when the handshake or enumeration results in that the succeeding transfer of digital audio data is possible.

In a further embodiment, additional to the above, the audio processor is configured to conduct a reset procedure between said first and second steps. A reset may in some instances be necessary, depending on the specific communication protocol used to be able to test further communication modes. For example, and in some bus architectures, a bus enumeration procedure is initiated only upon connection of the two devices. In the reset procedure, the processing unit may in one example send a corresponding reset command to the digital audio host. In another additional or alternative example, the processing unit is configured to emulate a disconnect of the audio processor from the digital audio host, i.e., to emulate a power-down/power-up cycle. Certainly, in an embodiment where the processing unit is configured for communication/configuration in more than two communication modes, a corresponding reset procedure may be conducted also between the second step and the subsequent step as well as between all further steps in which communication with a different communication mode is attempted.

In a further additional or alternative embodiment, the processing unit is configured to update the setting of the communication mode selector to reflect the communication mode with which a successful communication is possible. As will be apparent, in this embodiment, the above-mentioned "last known good configuration" is stored for a subsequent operation cycle.

According to another additional or alternative embodiment, the audio processor is additionally configured to convert the digital audio data into a predefined user device audio format. A conversion may be beneficial in case the connected user audio device does not support the format of the respective digital audio data received from the digital audio host during operation. The predefined user device audio format may be analog or digital and may be of one of the types, mentioned in the preceding. The user device audio format may be set by the user, e.g., using the above-mentioned user interface.

According to a second aspect of the present invention a headset system is provided, comprising at least a headset; and an audio processor for digital audio data. The audio processor comprises at least a host interface for connection to a digital audio host to transfer the digital audio data between the digital audio host and the audio processor, a device interface for connection to a user audio device, and a processing unit, connected with the host interface and the device interface.

Said processing unit according to the present aspect is configured to at least conduct a configuration procedure, in which the processing unit communicates with said digital audio host in one of at least a first communication mode and a second communication mode, which communication mode is selected according to the setting of a communication mode selector.

The headset system and in particular the headset and the audio processor according to the present aspect of the invention in further embodiments may be configured according to one or more of the embodiments, discussed in the preceding with reference to the first aspect of the invention.

According to another aspect of the present invention, a method of processing digital audio data with an audio processor is provided. The audio processor comprising at least a host interface for connection to a digital audio host to transfer the digital audio data between the digital audio host and the audio processor and a device interface for connection to a user audio device. In the method according to the present aspect, a configuration procedure is conducted, in which the audio processor it is configured to communicate with said digital audio source according to one of at least a first communication mode and a second communication mode, wherein the communication modes differ from each other, and wherein communication mode is selected according to the setting of a communication mode selector.

The method according to the present aspect of the invention in further embodiments may be conducted according to one or more of the embodiments, discussed in the preceding with reference to the first and/or second aspect of the invention.

According to another aspect of the present invention, an audio processor for digital audio data is provided, comprising at least a host interface for connection to a digital audio host to transfer the digital audio data between the digital audio host and the audio processor, a device interface for connection to a user audio device, and a processing unit, connected with the host interface and the device interface. According to the present aspect, said processing unit is configured to conduct a configuration procedure, in which in a first step the processing unit is configured to communicate with said digital audio host according to one of at least a first communication mode and a second communication mode, and in case the communication with the digital audio host is unsuccessful and in a second step communicate with said digital audio host in a communication mode, different from the communication mode, used in the previous step.

The audio processor according to the present aspect of the invention in further embodiments may be configured according to one or more of the embodiments, discussed in the preceding with reference to the preceding aspects of the invention.

According to yet another aspect of the invention, a headset system is provided, comprising at least a headset and an audio processor for digital audio data. The audio processor comprises at least a host interface for connection to a digital audio host to transfer the digital audio data between the digital audio host and the audio processor; a device interface for connection to a user audio device; and a processing unit, connected with the host interface and the device interface. The processing unit is configured to conduct a configuration procedure, in which in a first step the processing unit is configured to communicate with said digital audio host according to one of at least a first communication mode and a second communication mode, and in case the communication with the digital audio host is unsuccessful and in a second step communicate with said digital audio host in a communication mode, different from the communication mode, used in the previous step.

The audio processor according to the present aspect of the invention in further embodiments may be configured according to one or more of the embodiments, discussed in the preceding with reference to the preceding aspects of the invention.

According to yet another aspect of the invention, a method of processing digital audio data with an audio processor is provided, which audio processor comprises at least a host interface for connection to a digital audio host to transfer the digital audio data between the digital audio host and the audio processor; and a device interface for connection to a user audio device; wherein a configuration procedure is conducted, in which in a first step the audio processor is configured to communicate with said digital audio host according to one of at least a first communication mode and a second communication mode, and in case the communication with the digital audio host is unsuccessful and in a second step communicate with said digital audio host in a communication mode, different from the communication mode, used in the previous step.

The audio processor according to the present aspect of the invention in further embodiments may be configured according to one or more of the embodiments, discussed in the preceding with reference to the preceding aspects of the invention.

Reference will now be made to the drawings in which the various elements of embodiments will be given numerical designations and in which further embodiments will be discussed.

Specific reference to components, process steps, and other elements are not intended to be limiting. Further, it is understood that like parts bear the same reference numerals, when referring to alternate figures. It will be further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

Figure 1:
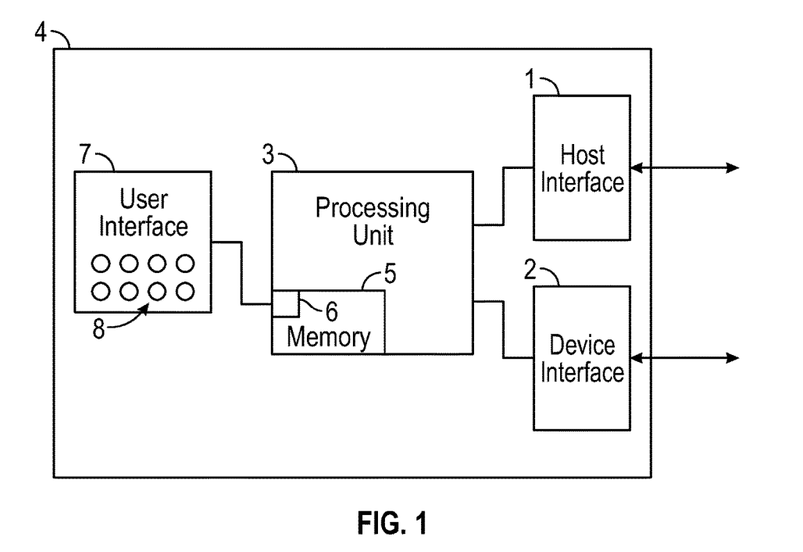
FIG. 1 shows a first embodiment of an audio processor according to the invention.

FIG. 1 shows a first embodiment of an audio processor 4 in a schematic block diagram. The audio processor 4 comprises a host interface 1 for connection with a digital audio host (not shown in FIG. 1) and to transfer digital audio data between the host and the audio processor 4. The audio processor 4 further comprises a device interface 2 for connection to a user audio device (not shown in FIG. 1), such as a set of speakers or a headphone/headset. As indicated in FIG. 1, the audio transfer according to the present embodiment is bidirectional, both with the digital audio host and the user audio device.

The two interfaces are connected with processing unit 3 of the audio processor 4. Processing unit 3 according to the present embodiment comprises a headphone decoder IC of type CX20873, available from Conexant Systems, Inc., Irvine, Calif., USA. The headphone decoder IC comprises a microcontroller (not shown) to process audio and to set-up the communication to the digital audio host and the user audio device, as will be discussed in more detail in the following description. Processing unit 3 further comprises RAM memory 5, which comprises a stored setting of a communication mode selector 6.

Audio processor 4 further comprises a user interface 7, having several controls 8. The user interface 7 is connected with processing unit 3 and allows the user to adjust the setting of the communication mode selector 6.

Audio processor 4 serves as an interface between the digital audio host, such as a computer, a smart phone, a tablet, a game console, or another digital audio source on one hand, and a user audio device, such as a loudspeaker or a headset, on the other hand. To allow a connection to a variety of digital audio hosts, processing unit 3 is configured to allow configuration in one of at least a first and a second communication mode, as will be explained in further detail in the following, in particular with reference to FIG. 3.

Figure 2:
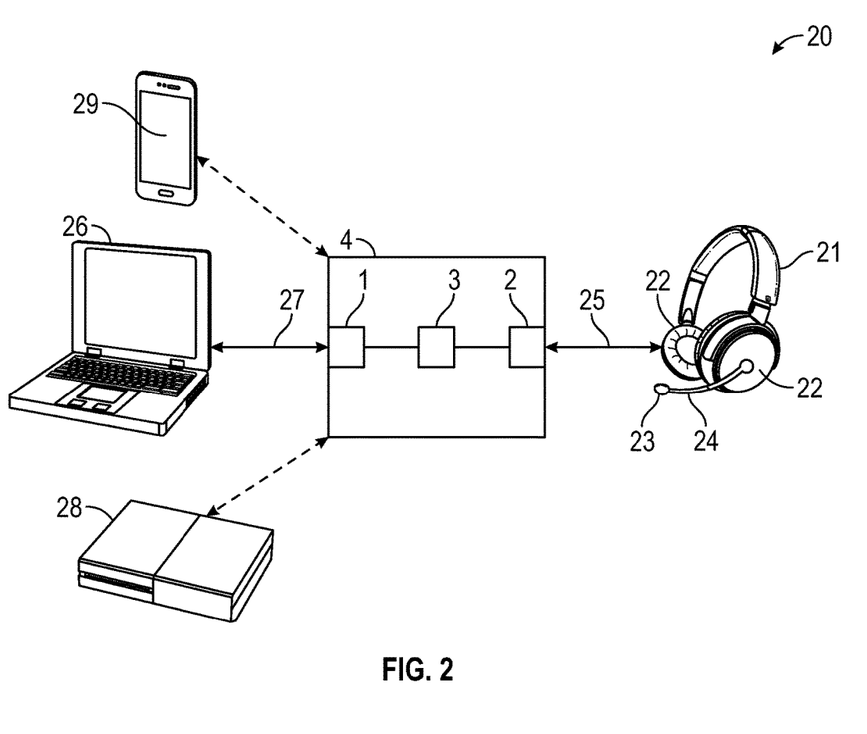
FIG. 2 shows a schematic view of the embodiment of FIG. 1, used in a headset system.

FIG. 2 shows a schematic view of the audio processor 4 of FIG. 1 in use with a headset 21, forming an embodiment of a headset system 20. The headset 21 is of circumaural type and comprises two headphone drivers (speakers) 22. A microphone 23 is mounted on a corresponding boom 24. The headset 21 is connected with the audio processor 4, and more precisely with device interface 2, over an analog cable connection 25. Note that for reasons of clarity, only some components of audio processor 4 are shown in FIG. 2.

The headset system 20, and again more precisely the host interface 1 of audio processor 4, is connected with computer 26 over a typical USB connection 27. Besides the data link, USB connection 27 also provides operating power to the audio processor 4. Further connections, instead of the connection with computer 26 are possible, as indicated by the dashed lines in FIG. 2. For example, a connection to a game console 28 or to a smart phone 29 is possible. Also with these devices, USB connection 27 would be used, however, alternatively to the connection to computer 26. It should be noted that the above-mentioned connections are exemplary and should not be understood as limiting. Further examples of digital audio hosts include tablet computers, TVs, stereo systems, MP3 players, PDAs, mobile gaming devices, smart watches, and other similar devices.

To allow a connection to a variety of different types of digital audio hots, processing unit 3 is configured to operate in a configuration procedure, as mentioned in the preceding. During the configuration procedure, the details of the data communication between audio processor 4 and the respective digital audio host, e.g., computer 26, are exchanged and the devices are configured correspondingly. In the context of USB connectivity, the configuration is also referred to as "bus enumeration" or "enumeration".

Figure 3:
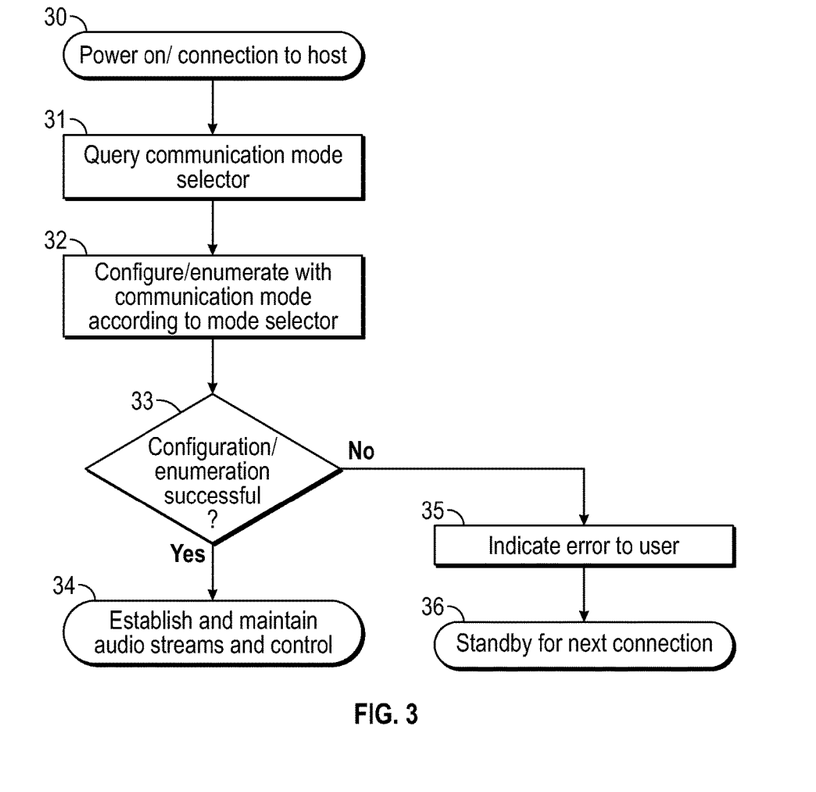
FIG. 3 shows a flow chart of the operation of the audio processor according to the embodiment of FIG. 1.

FIG. 3 shows a flow chart of the operation of the audio processor 4 during the configuration procedure. Upon a connection of the audio processor 4 to computer 26 over USB connection 27, which corresponds to a "power-up" of the device, the operation in the configuration procedure begins in step 30. In step 31, the processing unit 3 queries the setting of the communication mode selector 6, stored in memory 5 of processing unit 3. As discussed in the preceding, the setting of communication mode selector 6 by the user is possible using user interface 7 and more precisely, controls 8.

In step 32, the processing unit 3 begins communicating with the computer 26 with the communication mode that corresponds to the setting of the communication mode selector 6. The communication typically provides an exchange of several data packets between audio processor 4 and the digital audio host, i.e., here the computer 26.

Once the exchange of communication messages is completed, the processing unit 3 determines in step 33, whether the configuration was successful. If this is the case, the configuration procedure is concluded and the processing unit 3 establishes and then subsequently maintains and controls two audio streams, namely one incoming audio stream and one outgoing audio stream in step 34.

The incoming audio stream, i.e., from the digital audio host, is converted to analog audio by D/A-converter circuitry (not shown) of the processing unit 3 and is then provided to the device interface 2 and thus to the two headphones 22 of the headset 21.

The outgoing audio stream, i.e., from the microphone 23 of the headset 21, received over the device interface 2, is converted to digital audio by the D/A-converter circuitry and subsequently passed to the digital audio host, i.e., computer 26 in this example, using host interface 1 and USB connection 27. The digital audio data according to this embodiment, are encoded using the protocol, as specified by USB 2.0 specification, which may typically be linear PCM.

In case the configuration is determined by the processing unit 3 in step 33 to be unsuccessful, an error is indicated to the user in step 35, using a corresponding LED (not shown) of user interface 7. In this case, the processing unit 3 in step 36 then waits for a next connection event, i.e., a power-down/power-up cycle. The configuration procedure is then repeated.

Figure 4A:
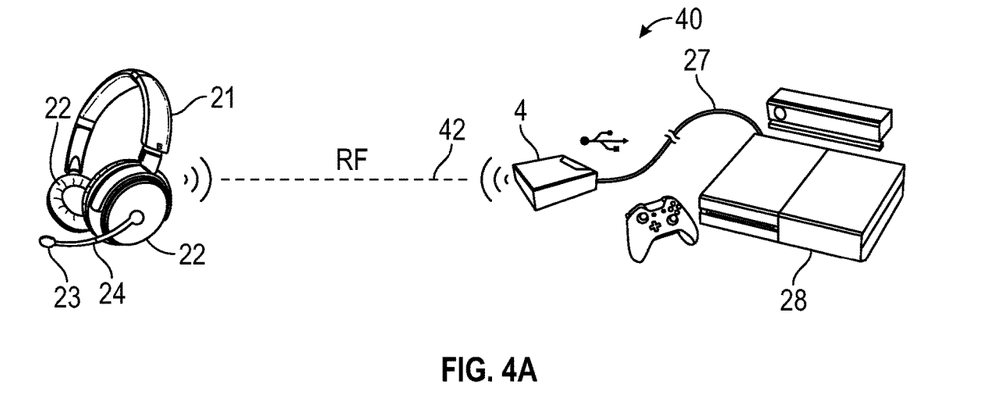
FIG. 4A shows a further embodiment of a headset system, connected to a digital audio host.

FIG. 4A shows a further embodiment of a headset system 40, which corresponds to the headset system 20 with the exception that the connection between audio processor 4 and headset 21 is a wireless RF connection 42 using linear PCM to transmit audio. Accordingly, device interface 2 and headset 21 in the present embodiment comprise correspondingly suitable radio transmitters.

As will be apparent from FIG. 4A, the headset system 40 and more precisely, host interface 1 (not shown on FIG. 4A) of audio processor 4 is connected with a game console 28 over USB connection 27.

According to the present embodiment, audio processor 4 of headset system 40 is configured to operate in two communication modes, namely in a first communication mode in which the audio processor 4 presents itself to the digital audio host, connected to USB connection 27, as a USB audio class device (USB Audio Device Class device), and a second communication mode in which the audio processor 4 presents itself to the digital audio host as an Xbox Gaming Device.

Figure 4B:
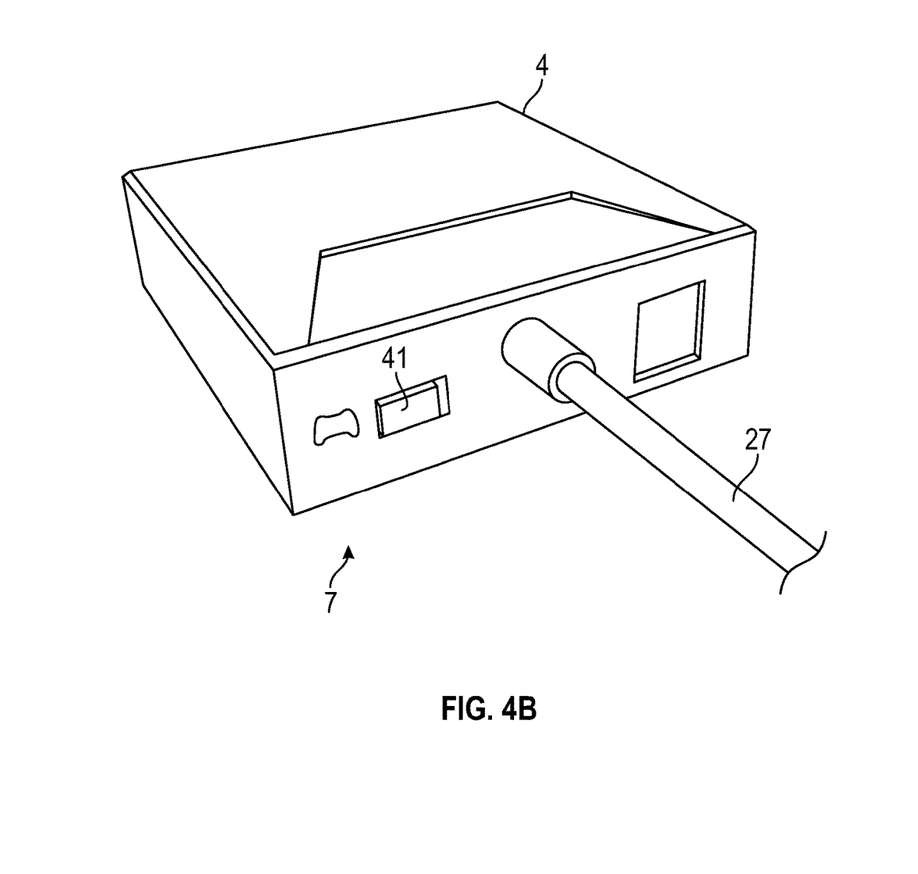
FIG. 4B shows a detailed perspective view of the audio processor of FIG. 4A.

The setting of the communication mode selector 6 in this embodiment is directly influenced by slide switch 41 if user interface 7, as can be seen from the detailed view of audio processor 4 in FIG. 4B.

Figure 5:
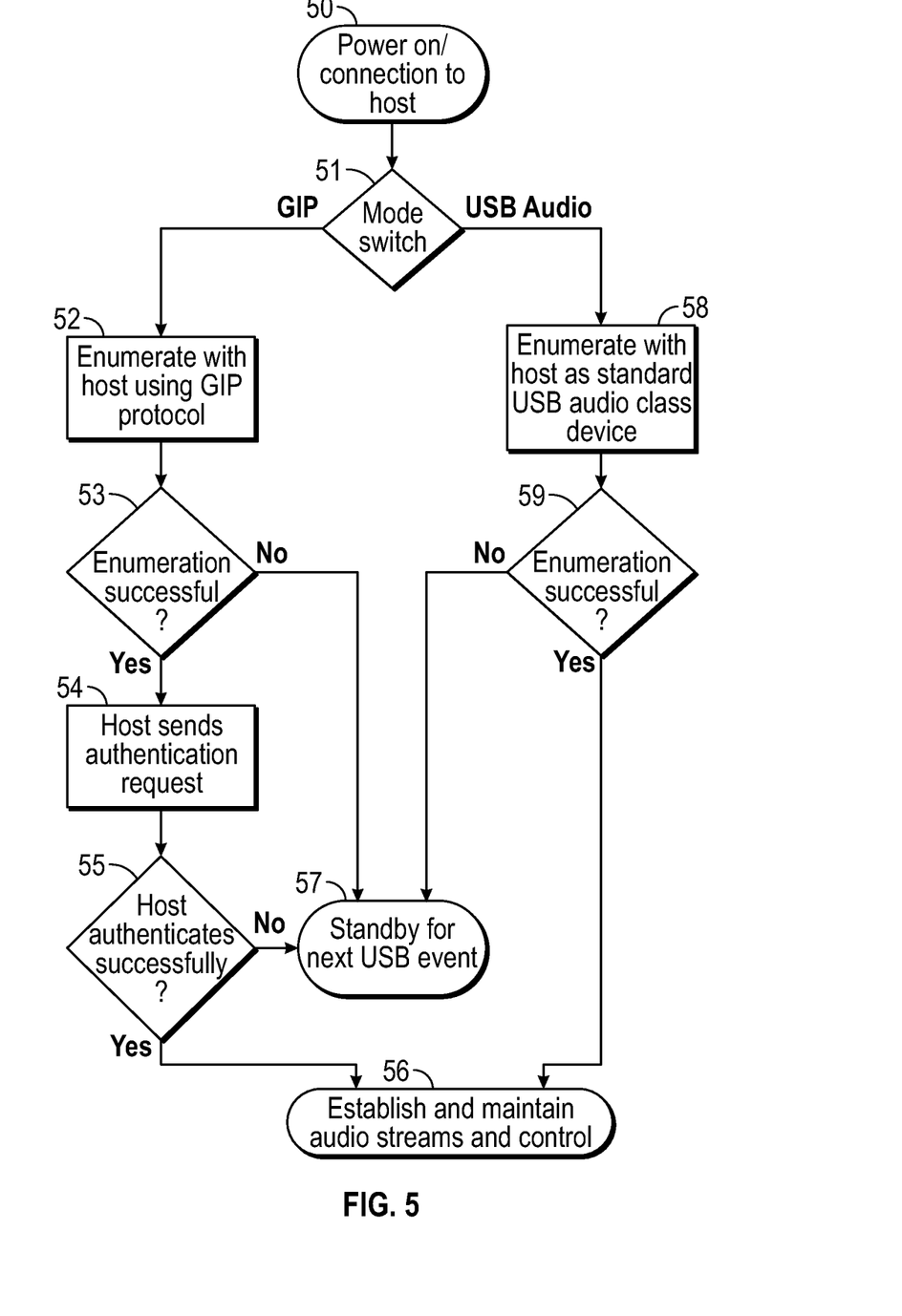
FIG. 5 shows a flow chart of the operation of the embodiment of FIGS. 4A and 4B.

The operation of audio processor 4 of headset system 40 according to the present embodiment is in the following discussed with reference to the flow chart of FIG. 5.

Upon a connection of the audio processor 4 to a digital audio host, e.g., game console 28, over USB connection 27, which corresponds to a "power-up" of the device, the operation in the configuration procedure begins in step 50. In step 51, the processing unit 5 queries the setting of communication mode selector 6 to determine, which communication mode is to be used.

In case switch 41 is set to "GIP" or "gaming console" and in step 52, the configuration/enumeration procedure is conducted in a GIP communication mode. In step 53, the processing unit 3 determines, whether the configuration was successful. If this is the case, the game console 28 sends an authentication request in step 54. The authentication is necessary due to the requirements of the GIP protocol to increase stability and security of the communication.

In step 55 it is determined by game console 28, whether the authentication was successful. If this is the case, the configuration procedure is concluded in step 56 and the processing unit 3 establishes and then subsequently maintains and controls two audio streams, namely one incoming audio stream and one outgoing audio stream.

In case the enumeration in step 53 or the authentication in step 55 is found to be unsuccessful, the processing unit 3 in step 57 then waits for a next operating cycle, i.e., a power-down/power-up cycle. The configuration procedure is then repeated.

In case switch 41 is set to "USB" or "PC", the configuration/enumeration procedure is conducted in a USB audio class communication mode in step 58. In step 59, the processing unit 3 determines, whether the configuration was successful. If this is the case, the configuration procedure is concluded in step 56 and the processing unit 3 establishes and then subsequently maintains and controls two audio streams, namely one incoming audio stream and one outgoing audio stream.

In case the enumeration in step 59 is found to be unsuccessful, the processing unit 3 in step 57 then waits for a next connection event, i.e., a power-down/power-up cycle. The configuration procedure is then repeated.

Figure 6:
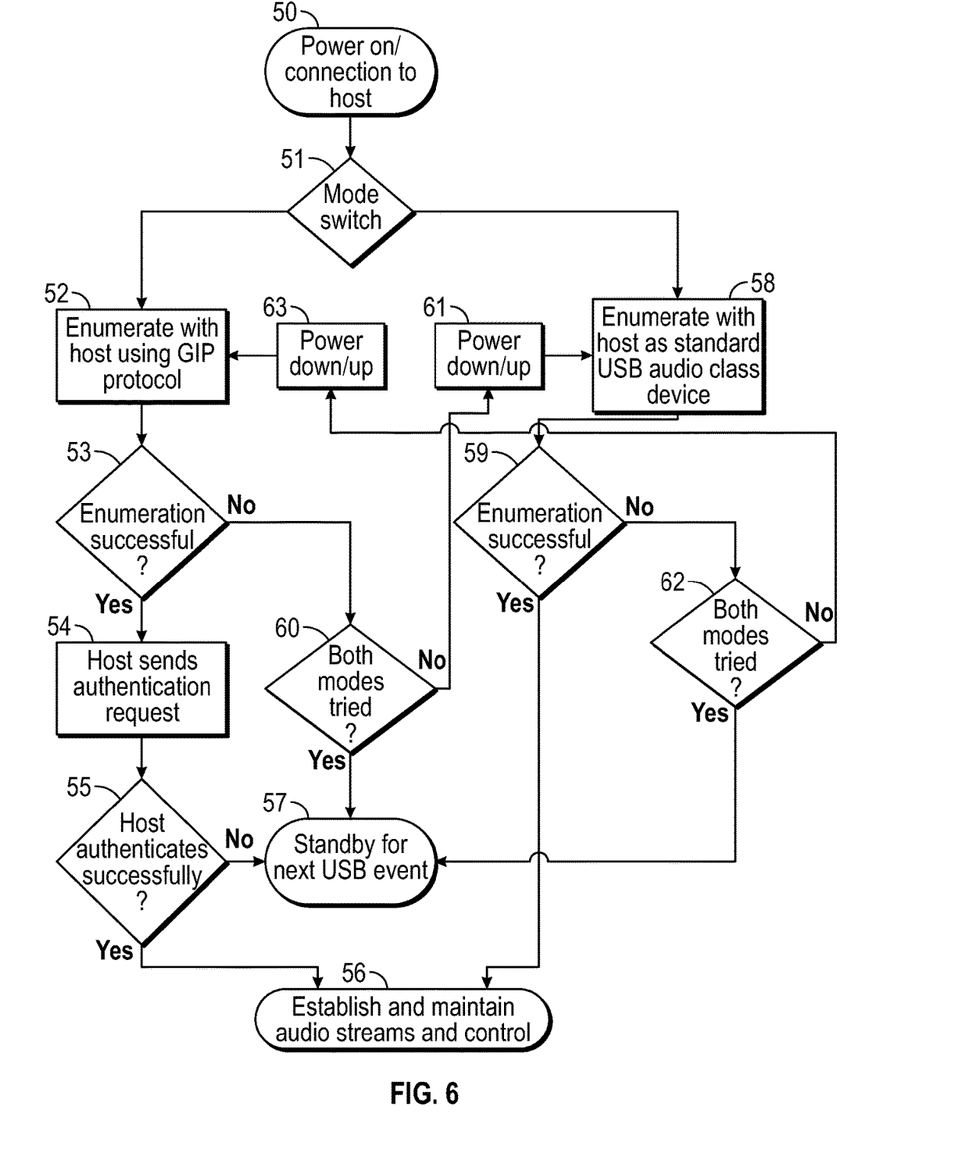
FIG. 6 shows a flow chart of an alternative operation of the embodiment of FIGS. 4A and 4B.

FIG. 6 shows a flow chart of an embodiment of an alternative configuration procedure for use with the headset system 40 according to FIG. 4. The operation corresponds to the preceding discussion of FIG. 5 with the exception of the handling of an unsuccessful enumeration in steps 53 and 59. According to the present embodiment and referring to an initial enumeration in GIP mode, in case the enumeration in step 53 is determined to be unsuccessful, in step 60 it is determined whether in the current operating cycle, communication in both modes was attempted already. If this is not the case, a power down/power up cycle, also referred to as "Soft Power Cycle Device", is emulated by the processing unit 3, and then, enumeration in USB audio class mode is attempted in step 58. The same applies in case an initial USB enumeration was unsuccessful in step 59. Here, the determination whether both modes already have been attempted is conducted in step 62. In case of the initial enumeration in this operating cycle, the power down/up emulation is conducted in step 63 and subsequently, enumeration in GIP mode is attempted in step 52.

Certainly, in case both modes were attempted already in steps 60 and 62, respectively, the processing unit 3 in step 57 then waits for a next operating cycle i.e., a power-down/power-up cycle. The configuration procedure is then repeated.

Note that the above term "current operating cycle" refers to a continuous USB connection between audio processor 4 and the respective audio host. Accordingly, a counter (not shown) in the memory 5 of processing unit 3 for determining, whether both modes were attempted already, is reset when the USB connection is disconnected.

As will be apparent from the preceding discussion of FIG. 6, the communication mode selector 6 and the corresponding setting of switch 41 allows to set a user preference regarding the communication mode to be used. However, even in case of an incorrect setting of switch 41, audio communication remains possible, which increases the ease of operation of the headset system 40 for the user.

Figure 7:
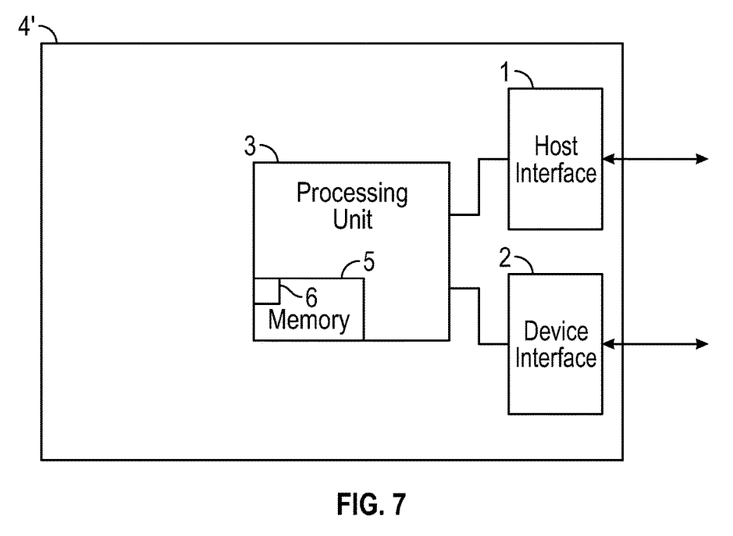
FIG. 7 shows a further embodiment of an audio processor according to the invention.

FIG. 7 shows a further embodiment of an audio processor 4' according to the invention. The audio processor 4' corresponds to audio processor 4, referred to in the preceding with reference to FIG. 1, with the exception, that audio processor 4 does not comprise a user interface 7 that would allow to adjust the setting of the communication mode selector 6.

The operation of audio processor 4' according to the embodiment of FIG. 7 is explained in the following with reference to the flow chart of FIG. 8.

The present embodiment allows for automatic communication mode selection and relies on the determination of the "last known good configuration", which is stored as the communication mode selector setting 6 in the memory 5 of the processing unit 3 during each operating cycle.

In line with the preceding discussion of the embodiments of FIG. 1-7, the configuration procedure also here starts upon a "Power-Up" event in step 80, i.e., when the audio processor 4' is connected to the respective digital audio host.

In step 81, enumeration is attempted with a communication mode, that corresponds to the setting of the communication mode selector 6. A corresponding dataset is stored in memory 5 of the processing unit 3, so that it is known later that configuration/enumeration with the present communication mode hat been attempted by the processing unit 3 in the current operating cycle.

Figure 8:
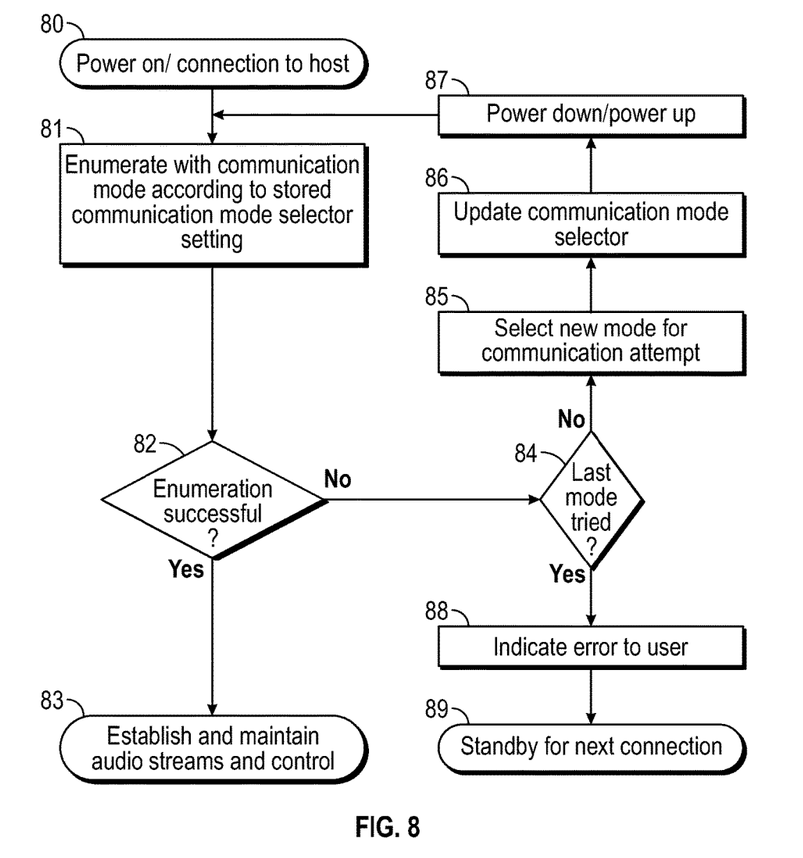
FIG. 8 shows a flow chart of the operation of the embodiment of FIG. 7.

As will be apparent from FIG. 8 and the following explanation, the communication mode selector 6 will in this embodiment automatically correspond to the last known good configuration.

In step 82, the processing unit 3 determines, whether the enumeration was successful. If this is the case, the configuration procedure is concluded in step 83 and the processing unit 3 establishes and then subsequently maintains and controls two audio streams, namely one incoming audio stream and one outgoing audio stream.

If the enumeration in step 82 is determined as not successful, the processing unit 3 in step 84 determines, whether all known communication modes have already been attempted in the current operating cycle. The processing unit 3 for this step retrieves the corresponding datasets from memory 5 and compares the datasets with the known communication mode.

In case configuration in all known modes have not been attempted yet, the processing unit 3 in step 85 determines a new communication mode. The determination is based on a pre-defined list, stored in memory 5 of the processing unit 3, which list is sorted based on how common the respective communication mode is. Note that while in the preceding discussion of FIGS. 4A-6, the audio processor 4 has been configured with two communication modes, the present embodiment is particularly suited for two or even more than two communication modes.

In step 86, the communication mode selector 6 is updated in accordance with the selected communication mode. In step 87, and as previously discussed, the processing unit 3 emulates a power down/power up cycle ("Soft Power Cycle Device"). Enumeration with the newly selected communications mode is then attempted in step 81.

In case the determination in step 84 results in that the last known communication mode was already attempted, a corresponding error is indicated to the user in step 88, i.e., by an audio message, provided to the connected headset. The processing unit 3 then awaits the next connection in step 89.

Figure 9:
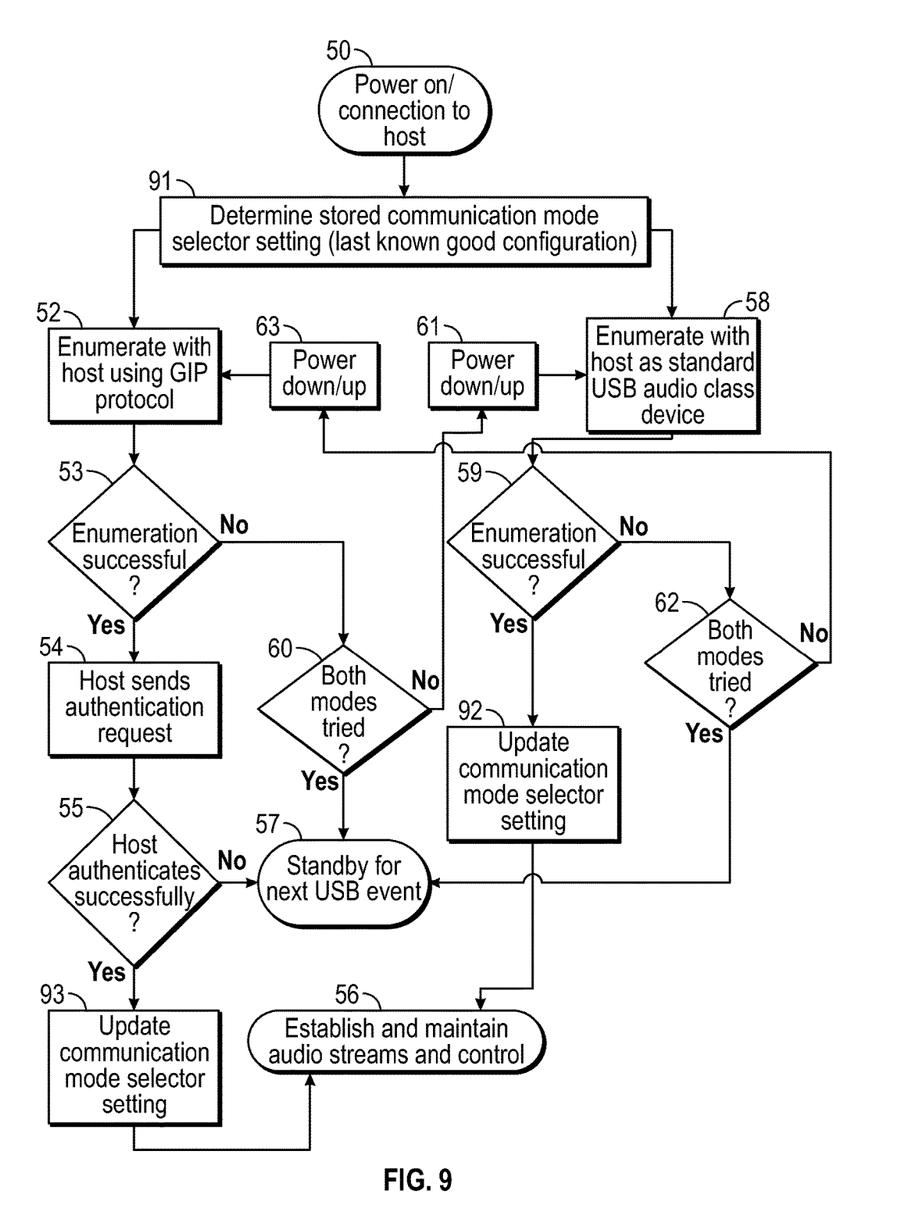
FIG. 9 shows a flow chart of an alternative operation of the embodiment of FIG. 7.

FIG. 9 shows a flow chart of an embodiment of an alternative configuration procedure for audio processor 4' of FIG. 7. The operation according to the present embodiment corresponds to the operation, discussed in the preceding with reference to FIG. 6 with the exception that the embodiment again relies on the determination of the "last known good configuration". After start-up in step 50, the last known good configuration, i.e., the communication mode selector setting 6 is retrieved from memory 5 in step 91 instead of using switch 41. The further procedure then corresponds to the above discussion of FIG. 6. The communication mode selector setting 6 is updated in case of a successful enumeration, i.e., in steps 92 and 93, as can be seen from FIG. 9.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment in which:

the audio processor 4, 4' comprises rechargeable battery and is powered by the battery, the audio processor 4, 4' is formed integrally with a control unit according to utility patent application U.S. Ser. No. 14/991,441, entitled "Headset audio system", filed on Jan. 8, 2016, the user interface 7 allows to adjust other user settings, the user interface 7 additionally comprises a (touch) screen, and/or.

instead of the processing unit 3 having internal memory 5, the memory 5 is provided external of the processing unit 3.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. An audio processor for digital audio data, comprising at least a host interface for connection to a digital audio host to transfer the digital audio data between the digital audio host and the audio processor;
a device interface for connection to a user audio device; and
a processing unit, connected with the host interface and the device interface;
wherein said processing unit is configured to at least conduct a configuration procedure, in which the processing unit communicates with said digital audio host in one of at least a first communication mode and a second communication mode,
wherein the communication modes differ from each other, and wherein the communication mode is selected according to the setting of a communication mode selector, and
wherein the first communication mode and the second communication mode are mutually exclusive enumeration processes.

2. The audio processor according to claim 1, wherein the device interface comprises a wireless transmitter for connection to a wireless headset.

3. The audio processor according to claim 1, wherein the configuration procedure is an initial enumeration procedure, initiated upon start-up of the audio processor.

4. The audio processor according to claim 1, wherein the communication in said first communication mode corresponds to USB enumeration and the communication in said second communication mode differs from USB enumeration.

5. The audio processor according to claim 1, wherein the communication in said second communication mode corresponds to GIP enumeration.

6. The audio processor according to claim 1, wherein said processing unit is configured to communicate with the digital audio host according the selected communication mode after the configuration procedure.

7. The audio processor according to claim 1, wherein the communication mode selector is pre-defined by a user.

8. The audio processor according to claim 1, wherein a user interface is provided to allow the setting of the communication mode selector to be adjusted.

9. The audio processor according to claim 1, wherein the communication mode selector setting is determined automatically by the processing unit from a previous operation cycle.

10. The audio processor according to claim 1, wherein the processing unit is configured in the configuration procedure to in a first step communicate with said digital audio host according to the communication mode, identified by the setting of the communication mode selector, and in case the communication with the digital audio host is unsuccessful and in a second step communicate with said digital audio host in a communication mode, different from the communication mode, used in the previous step.

11. The audio processor according to claim 10, wherein the processing unit is additionally configured to conduct a reset procedure between said first and second steps.

12. The audio processor according to claim 10, wherein in a further step during the configuration procedure, the setting of the communication mode selector is updated to correspond to the communication mode, which allowed successful communication with the digital audio host.

13. The audio processor according to claim 1, wherein the audio processor is additionally configured to convert the digital audio data into a predefined user device audio format.

14. Headset system, comprising
at least a headset; and
an audio processor for digital audio data, comprising at least a host interface for connection to a digital audio host to transfer the digital audio data between the digital audio host and the audio processor;
a device interface for connection to a user audio device; and a processing unit, connected with the host interface and the device interface;
wherein said processing unit is configured to at least conduct a configuration procedure, in which the processing unit communicates with said digital audio host in one of at least a first communication mode and a second communication mode,
wherein the communication modes differ from each other, and
wherein the communication mode is selected according to the setting of a communication mode selector, and
wherein the first communication mode and the second communication mode are mutually exclusive enumeration processes.

15. Method of processing digital audio data with an audio processor, comprising at least a host interface for connection to a digital audio host to transfer the digital audio data between the digital audio host and the audio processor; and a device interface for connection to a user audio device; wherein
a configuration procedure is conducted, in which the audio processor it is configured to communicate with said digital audio source according to one of at least a first communication mode and a second communication mode,
wherein the communication modes differ from each other, and
wherein the communication mode is selected according to the setting of a communication mode selector, and wherein the first communication mode and the second communication mode are mutually exclusive enumeration processes.

16. An audio processor for digital audio data, comprising
at least a host interface for connection to a digital audio host to transfer the digital audio data between the digital audio host and the audio processor;
a device interface for connection to a user audio device; and
a processing unit, connected with the host interface and the device interface; wherein said processing unit is configured to conduct a configuration procedure, in which in a first step the processing unit is configured to communicate with said digital audio host according to one of at least a first communication mode and a second communication mode, and in case the communication with the digital audio host fails and in a second step to communicate with said digital audio host in a communication mode, different from the communication mode, used in the previous step;
wherein communication in said second communication mode corresponds to GIP enumeration.

17. The audio processor according to claim 16, wherein the second step is repeated with a communication mode, different from the communication modes of the previous steps, until the communication with the digital audio host is successful.

18. The audio processor according to claim 16, wherein the audio processor is additionally configured to conduct a reset procedure between all steps.

19. Headset system, comprising at least
a headset; and
an audio processor for digital audio data, comprising at least a host interface for connection to a digital audio host to transfer the digital audio data between the digital audio host and the audio processor;
a device interface for connection to a user audio device; and
a processing unit, connected with the host interface and the device interface;
wherein:
said processing unit is configured to conduct a configuration procedure, in which in a first step the processing unit is configured to communicate with said digital audio host according to one of at least a first communication mode and a second communication mode, and in case the communication with the digital audio host fails then in a second step communicate with said digital audio host in a communication mode, different from the communication mode, used in the previous step; and
communication in said second communication mode corresponds to GIP enumeration.

20. Method of processing digital audio data with an audio processor, comprising at least a host interface for connection to a digital audio host to transfer the digital audio data between the digital audio host and the audio processor; and a device interface for connection to a user audio device;
wherein a configuration procedure is conducted, in which in a first step the audio processor is configured to communicate with said digital audio host according to one of at least a first communication mode and a second communication mode, and in case the communication with the digital audio host fails and
in a second step communicate with said digital audio host in a communication mode, different from the communication mode, used in the previous step; and wherein communication in said second communication mode corresponds to GIP enumeration.

* * * * *